United States Patent  
Snyder et al.

(10) Patent No.: US 12,448,929 B2
(45) Date of Patent: Oct. 21, 2025

(54) APPARATUSES, METHODS, AND SYSTEMS INCLUDING ENGINE HIGH-SPEED STARTING CAPABILITY

(71) Applicant: Cummins Inc., Columbus, IN (US)

(72) Inventors: David B. Snyder, Greenwood, IN (US); Ming-Feng Hsieh, Nashville, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 18/729,201

(22) PCT Filed: Jan. 13, 2023

(86) PCT No.: PCT/US2023/060603
§ 371 (c)(1),
(2) Date: Jul. 16, 2024

(87) PCT Pub. No.: WO2023/147226
PCT Pub. Date: Aug. 3, 2023

(65) Prior Publication Data
US 2025/0109716 A1    Apr. 3, 2025

Related U.S. Application Data

(60) Provisional application No. 63/267,318, filed on Jan. 31, 2022.

(51) Int. Cl.
*G06G 7/70* (2006.01)
*F01L 13/08* (2006.01)
(Continued)

(52) U.S. Cl.
CPC ............ *F02D 41/062* (2013.01); *F01L 13/08* (2013.01); *F02N 11/0851* (2013.01)

(58) Field of Classification Search
CPC ..... B60W 10/06; B60W 10/08; F02D 41/062; F02N 2300/2002
(Continued)

(56) References Cited

U.S. PATENT DOCUMENTS 7,237,521 B2    7/2007    Yuya et al.
9,709,014 B2    7/2017    Puri et al.
(Continued)

FOREIGN PATENT DOCUMENTS

DE    102016009325    2/2017
EP    0974740    1/2000
(Continued)

OTHER PUBLICATIONS

International Search Report and Written Opinion for International patent application No. PCTU2360603, filed Jan. 13, 2023, mailed May 17, 2023, 10 pgs.

*Primary Examiner* — Logan M Kraft
*Assistant Examiner* — James J Kim
(74) *Attorney, Agent, or Firm* — Taft, Stettinius & Hollister LLP (57) ABSTRACT

A method of operating a vehicle including an engine includes suspending operation of the engine during operation of the vehicle including stopping fueling of the engine. The method includes accelerating the engine to a high-speed starting speed with fueling of the engine stopped and a cylinder decompression mechanism activated, the high-speed starting speed being greater than an idle speed of the engine. The method includes resuming operation of the engine including deactivating the cylinder decompression mechanism at the high-speed starting speed and thereafter restarting fueling of the engine.

24 Claims, 3 Drawing Sheets

(51) Int. Cl.
*F02D 41/06* (2006.01)
*F02N 11/08* (2006.01)

(58) Field of Classification Search
USPC .......................................................... 701/112
See application file for complete search history.

(56) References Cited

U.S. PATENT DOCUMENTS

| | | |
|---|---|---|
| 10,626,764 B2 | 4/2020 | Xiong et al. |
| 10,927,724 B2 | 2/2021 | Nielsen et al. |
| 2008/0216787 A1 | 9/2008 | Kroepke et al. |
| 2009/0005214 A1 | 1/2009 | Hughes |
| 2009/0287400 A1 | 11/2009 | Pursifull |
| 2012/0265427 A1* | 10/2012 | Petridis ................ B60W 10/02 |
| | | 701/113 |
| 2014/0195089 A1 | 7/2014 | Kobayashi et al. |
| 2019/0178113 A1 | 6/2019 | McCarthy, Jr. et al. |
| 2019/0344780 A1* | 11/2019 | Ruybal ................ B60W 20/30 |
| 2020/0116116 A1* | 4/2020 | Gerty .................... F02N 19/004 |
| 2021/0131395 A1* | 5/2021 | Gerty ................. F02N 11/0844 |

FOREIGN PATENT DOCUMENTS

| | | |
|---|---|---|
| WO | 2019064034 | 4/2019 |
| WO | 2020211981 | 10/2020 |

\* cited by examiner

APPARATUSES, METHODS, AND SYSTEMS INCLUDING ENGINE HIGH-SPEED STARTING CAPABILITY

CROSS-REFERENCE TO RELATED APPLICATION

The present application claims priority to International Patent Application No. PCT/US23/60603, filed Jan. 13, 2023, which claims priority to U.S. Provisional Application Ser. No. 63/267,318 filed on Jan. 31, 2022, the contents of which are incorporate herein by reference in their entirety

TECHNICAL FIELD

The present disclosure relates to apparatuses, methods, and systems including engine high-speed starting capability.

BACKGROUND

Engine starting events are known to have a number of undesirable results. For example, when a piston engine is started, energy is required to initiate rotation of the engine before combustion can begin and must overcome engine inertia, friction, compression losses, and pumping losses imposing a penalty on energy efficiency. Furthermore, combustion instability or incomplete combustion can occur during engine starting events increasing undesirable emissions and/or increasing noise, vibration, and harshness (NVH). Such issues are compounded in the case of vehicles with engine stop-start and/or engine-off coasting features which increase the number of engine start events relative to systems without these features. Existing proposals for engine starting suffer from the foregoing and other shortcomings and disadvantages. There remains a significant unmet need for the unique apparatuses, methods, and systems disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

SUMMARY OF THE DISCLOSURE

Example embodiments include unique apparatuses, methods, and systems including engine high-speed starting capability. Further embodiments, forms, objects, features, advantages, aspects, and benefits shall become apparent from the following description and drawings.

DETAILED DESCRIPTION OF EXAMPLE EMBODIMENTS

Figure 1:
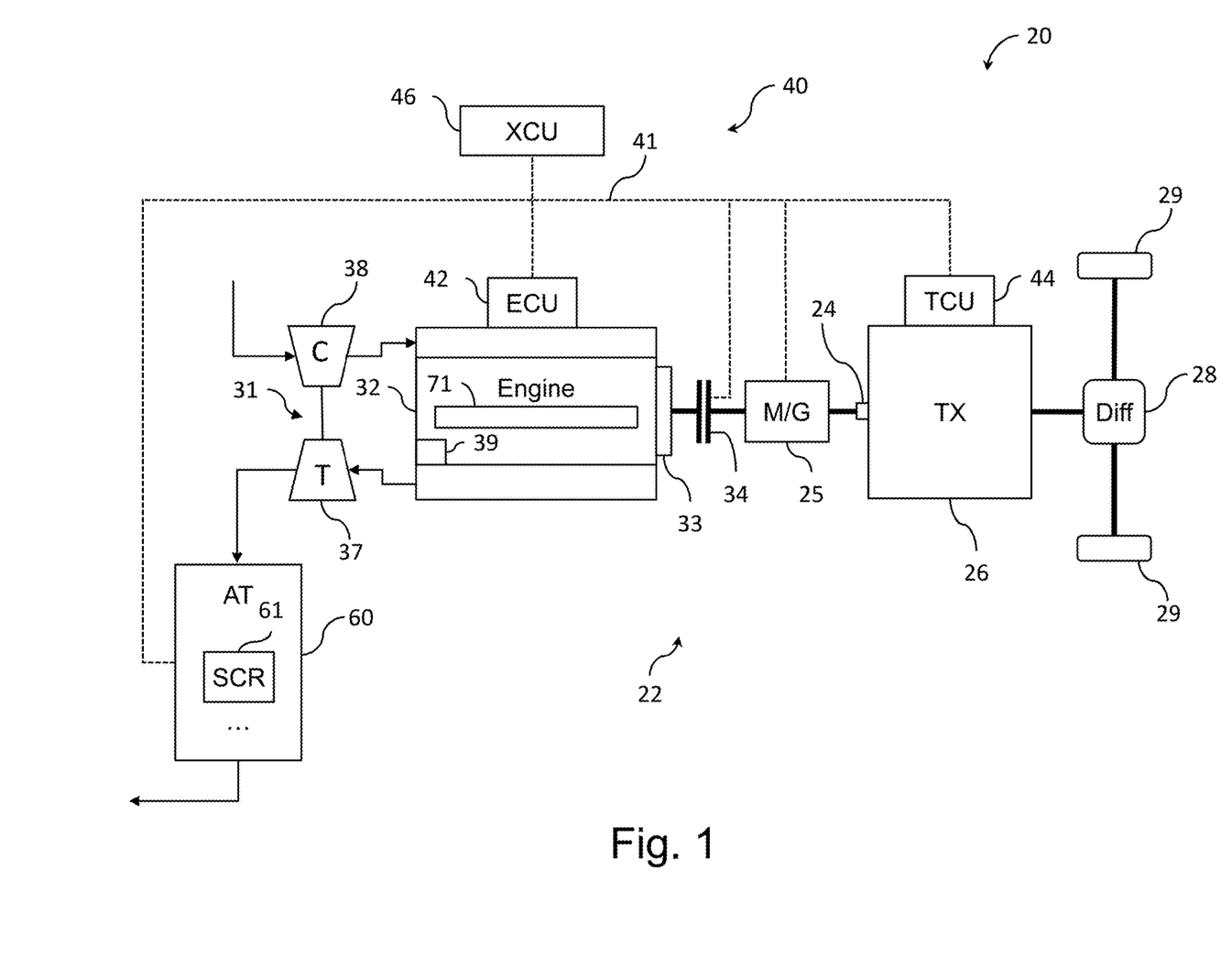
FIG. 1 is a schematic diagram illustrating certain aspects of an example vehicle system.

With reference to FIG. 1, there is illustrated an example vehicle system 20. In the illustrated embodiment, vehicle system 20 includes a powertrain 22 including an internal combustion engine 32, a flexplate 33, a clutch 34, a motor/generator 25, a transmission 26, a differential 28, and ground engaging wheels 29. In the illustrated embodiment, vehicle system 20 is propelled by ground engaging wheels 29 which are configured and provided as rear wheels. In other embodiments, front-wheel drive, four-wheel drive, and all-wheel drive approaches are contemplated. In various embodiments, vehicle system 20 may be configured and provided as an on-road bus, delivery truck, a service truck, or the like. In other aspects, vehicle system 20 may be configured and provided as a different type of vehicle, including other types of on-road or off-road vehicles. In still other embodiments, vehicle system 20 may be configured and provided as another type of vehicle.

In the illustrated embodiment, the powertrain 22 includes internal combustion engine 32 operatively coupled with and configured to provide torque to a flexplate 33. In some embodiments, flexplate 33 may alternatively be configured and provided as a flywheel. A first side of clutch 34 is operatively coupled with and configured to provide torque to (or receive torque from) flexplate 33 and, in turn, engine 32. A second side of clutch 34 is operatively coupled with and configured to provide torque to (or receive torque from) motor/generator 25 and, in turn, an input shaft 24 of the transmission 26 and, in turn, to other components of the powertrain 22 which may be coupled therewith.

Clutch 34 is electronically controllable between a closed state and an open state. In the closed state, torque applied to the first side of clutch 34 is transferred to the second side of clutch 34 and vice-versa, for example, via clutch plates which are urged into contact with one another. In the open state, torque is not transferred between the first side and the second side of clutch 34, for example, due to a gap or separation between clutch plates.

Motor/generator 25 is configured and provided in the form of a traction motor which is separate and distinct from a starter motor 39 which is coupled with and dedicated to starting the engine 32 under some conditions. In some embodiments, starter motor 39 may be omitted. Motor/generator 25 is operable as a motor to output torque to input shaft 24 of transmission 26 to propel the vehicle. Such operation may occur with clutch 34 being open such that only motor/generator 25 is used to propel the vehicle, or with clutch 34 being closed such that motor/generator 25 propels the engine in combination with engine 32. Motor/generator 25 is further operable as a generator to receive torque from input shaft 24 of transmission 26, for example, during regenerative braking operation. Motor/generator 25 is further operable as a motor to drive engine 32 via clutch 34 and flexplate 33, for example, during engine restart operations.

In the illustrated embodiment, the powertrain 22 is configured and provided as a parallel hybrid combustion engine-electric powertrain system. In other embodiments, the powertrain 22 may be provided in other forms of a hybrid combustion engine-electric powertrain system. In other embodiments, powertrain 22 may be provided in the form of a combustion engine powertrain system and motor/generator 25 may be omitted. In some such forms, clutch 34 may also be omitted.

In the illustrated embodiment, the powertrain 22 is configured and provided with clutch 34 being coupled with and positioned between engine 32 and motor/generator 25. In other embodiments, clutch 34 may be coupled with and positioned between motor/generator 25 and input shaft 24 of transmission 26. In other embodiments, clutch 34 may be coupled with and positioned between engine 32 and motor/generator 25 and another clutch may be coupled with and positioned between motor/generator 25 and input shaft 24 of transmission 26.

Transmission 26 may be configured and provided in a number of forms. In some forms, transmission 26 may be configured and provided as a manual transmission including a gearbox and an operator-actuated internal clutch. In some forms, transmission 26 may be configured and provided as an automated manual transmission including a gearbox and an internal clutch which may be automatically actuated or actuated in response to operator input. In some forms, transmission 26 may be configured and provided as an automatic transmission including a planetary gear set. In some forms, transmission 26 may be configured and provided as continuously variable transmission.

In the illustrated embodiment, engine 32 is configured as a turbocharged, compression-ignition diesel engine including a compression release system 71. It shall be appreciated that engine 32 may be provided as another type of engine in other embodiments. In the illustrated embodiment, powertrain 22 is powered only by engine 32. Powertrain 22 may be provided with a turbocharger 31 including a turbine 37 and a compressor 38. Turbine 37 extracts exhaust gas from engine 32 to drive compressor 38 to force air back to engine 32. In other embodiments, powertrain 22 may be provided with torque from additional components such as an electric motor operatively coupled with a battery or other energy storage system (e.g., in embodiments where the powertrain is configured as a hybrid powertrain), one or more vehicle accessories or other power providing component.

Compression release system 71 may be provided in a number of forms which are configured and operable to reduce cylinder pressure during a compression stroke of engine 32 relative to the cylinder pressure that would otherwise result from the compression stroke. In some forms, compression release system 71 may be configured and provided as a variable valve actuation (VVA) system. In some such forms, a hydraulic or electric actuator may be provided in a valvetrain between a valve of engine 32 and a valve cam of engine 32 and may be electronically controlled to vary the response of the valve to the valve cam. For example, such an actuator may be provided to selectably maintain an exhaust valve open during at least a part of a compression stroke of the engine 32.

In the illustrated embodiment, vehicle system 20 may include an exhaust aftertreatment system 60 provided downstream of engine 32 that injects a liquid-reductant agent through a special catalyst into the exhaust stream of a diesel engine. The exhaust aftertreatment system 60 may include a selective catalyst reduction (SCR) catalyst 61 configured to inject a liquid-reductant agent into the exhaust stream.

The vehicle system 20 includes an electronic control system (ECS) 40 which includes a plurality of control components and structures. ECS 40 preferably includes one or more programmable microprocessors or microcontrollers of a solid-state, integrated circuit type which are provided in one or more constituent control units of ECS 40. It is also contemplated that ECS 40 may include other types of integrated circuits and/or discrete circuit control units. In the illustrated embodiment, ECS 40 includes an engine control unit (ECU) 42, a transmission control unit (TCU) 44, and may also include one or more additional control units (XCU) 46. ECU 42, TCU 44, and XCU 46 (where present) are operatively coupled with and configured for communication over a network 41 which may be configured as a controller area network (CAN) or another type of network providing communication capabilities. ECS 40 is also operatively coupled with various components and systems of the vehicle system 20 via network 41 or one or more additional or alternative networks.

ECS 40 can be implemented in a number of configurations that combine or distribute control components, functions, or processes across one or more control units in various manners. ECS 40 executes operating logic that defines various control, management, and/or regulation functions. This operating logic may be in the form of dedicated hardware, such as a hardwired state machine, analog calculating machine, programming instructions, and/or a different form as would occur to those skilled in the art. ECS 40 may be provided as a single component or a collection of operatively coupled components; and may be comprised of digital circuitry, analog circuitry, or a hybrid combination of both of these types. When of a multi-component form, ECS 40 may have one or more components remotely located relative to the others in a distributed arrangement. ECS 40 can include multiple processing units arranged to operate independently, in a pipeline processing arrangement, in a parallel processing arrangement, or the like. It shall be further appreciated that ECS 40 and/or any of its constituent components may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or components as would occur to those skilled in the art to perform the desired communications.

Figure 2:
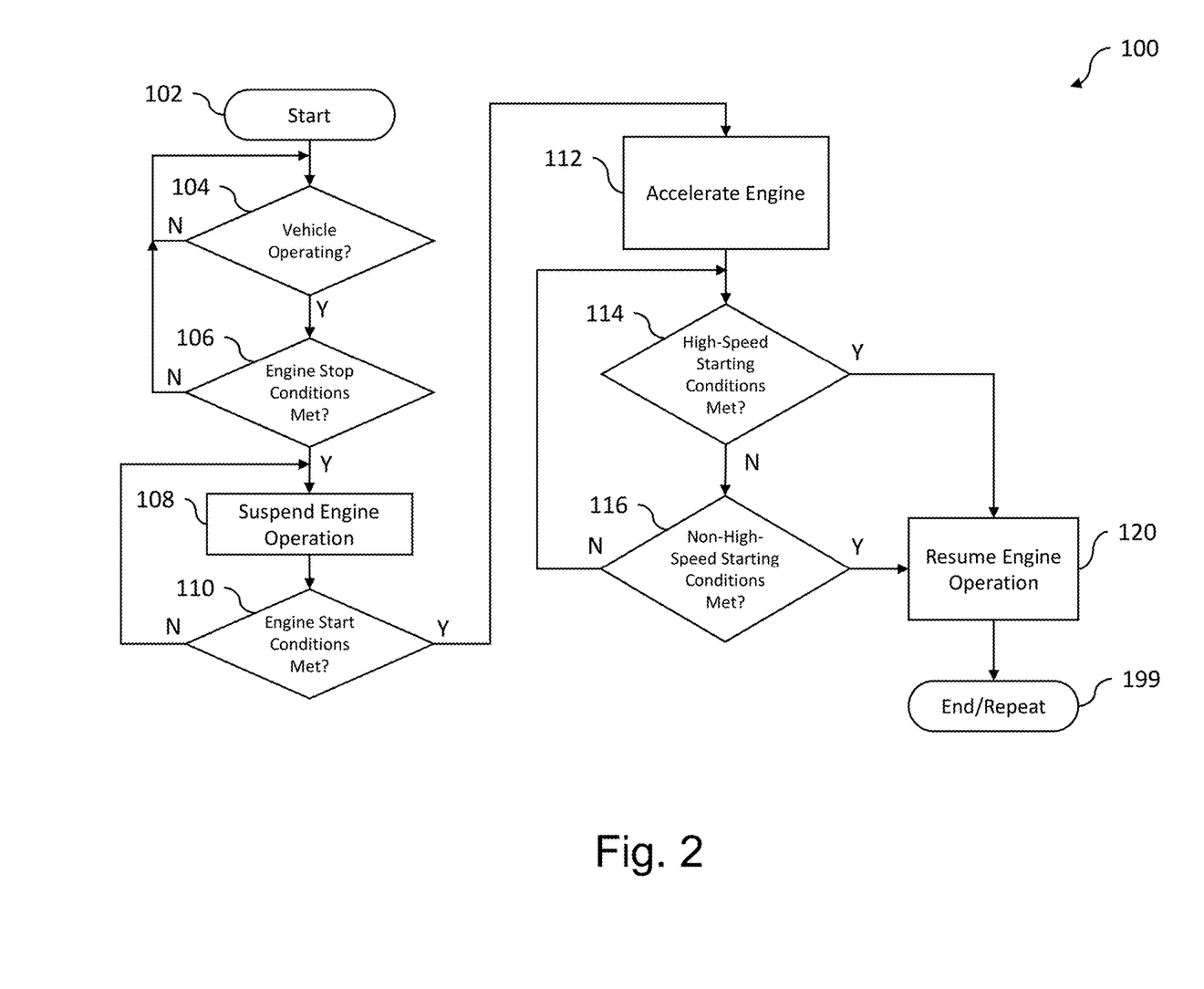
FIG. 2 is a flowchart illustrating certain aspects of an example control method.

With reference to FIG. 2, there is illustrated an example method 100 which may be implemented and performed by operating an electronic control system such as ECS 40 or another electronic control system operatively coupled with a vehicle system (e.g., vehicle system 20 or another vehicle system) including an engine (e.g., engine 32 or another engine). When implemented and performed by ECS 40, method 100 may be performed, in whole or in part, by ECU 42, TCU 44, XCU 46, other components of ECS 40, or by combinations of such components.

Method 100 is initiated at start operation 102. From start operation 102, method 100 proceeds to conditional 104 which evaluates whether a vehicle system (e.g., vehicle system 20 or another vehicle system) is operating. The evaluation performed by conditional 102 may consider, for example, the key on/off state of the vehicle system, the engine on/off operating state, or other indicators of vehicle operation. If conditional 104 evaluates negative, method 100 repeats the evaluation of conditional 104. If conditional 104 evaluates affirmative, method 100 proceeds to conditional 106.

Conditional 106 evaluates whether engine stop conditions are met. If conditional 106 evaluates negative, method 100 returns to conditional 104. The evaluation performed by conditional 106 may consider a number of factors.

In vehicle systems equipped with engine-off coast capability, conditional 106 may evaluate whether one or more temperature conditions associated with an engine system (e.g., coolant temperature, oil temperature, exhaust temperature, aftertreatment temperature) are sufficient to enable or command an engine stop. In such systems, conditional 106 may further evaluate whether one or more look-ahead road grade conditions are sufficient to enable or command an engine stop (e.g., whether the look-ahead road grade offers an opportunity for vehicle coasting and whether that opportunity offers a potential fuel efficiency benefit). In such systems, conditional 106 may further evaluate whether one or more safety conditions (e.g., current vehicle speed, predicted vehicle speed, traffic conditions) are sufficient to enable or command an engine stop. Such systems may evaluate additional and/or alternative conditions to determine whether to enable or command engine stop.

In vehicle systems equipped with engine stop-start capability, conditional 106 may evaluate whether one or more temperature conditions associated with an engine system (e.g., coolant temperature, oil temperature, exhaust temperature, aftertreatment temperature) are sufficient to enable or command an engine stop. In such systems, conditional 106 may further evaluate whether vehicle speed is sufficient to enable or command an engine stop (e.g., whether vehicle speed is zero or below a minimum threshold). In such systems, conditional 106 may further evaluate whether a predicted stop tine is sufficient to enable or command an engine stop (e.g., based on observed or predicted information about traffic conditions). Such systems may evaluate additional and/or alternative conditions to determine whether to enable or command engine stop.

If conditional 106 evaluates affirmative, method 100 proceeds to operation 108. Operation 108 stops fueling of the engine. In some embodiments, operation 108 may perform additional acts. For example, in some embodiments, operation 108 or a subsequent operation may interrupt torque transmission between the engine and ground-contacting wheels of the vehicle. In some embodiments, operation 108 or a subsequent operation may disengage or open a clutch such as clutch 34 or another clutch operatively coupled with and positioned intermediate an engine and ground-contacting wheels of a vehicle. In some embodiments, operation 108 or a subsequent operation may shift a transmission into neutral (e.g., transmission 26 or another transmission operatively coupled with and positioned intermediate an engine and ground-contacting wheels of the vehicle).

From operation 108, method 100 proceeds to conditional 110. Conditional 110 evaluates whether engine start conditions are met. If conditional 110 evaluates negative, method 100 returns to operation 108. If conditional 110 evaluates affirmative, method 100 proceeds to operation 112. The evaluation performed by conditional 110 may consider a number of factors.

In vehicle systems equipped with engine-off coast capability, conditional 110 may evaluate whether one or more of the engine off coast capability conditions described above in connection with conditional 106 has experienced a change in logical state (e.g., changed from true to false). In such systems, conditional 110 may evaluate additional and/or alternative conditions to determine whether to enable or command engine stop.

In vehicle systems equipped with engine stop-start capability, conditional 110 may evaluate whether one or more of the engine start-stop capability conditions described above in connection with conditional 106 has experienced a change in logical state (e.g., changed from true to false). In such systems, conditional 110 may evaluate additional and/or alternative conditions to determine whether to enable or command engine stop.

Operation 112 accelerates the engine of the vehicle toward a high-speed starting speed. As utilized herein, the term high-speed starting speed refers to an engine speed that is greater than an idle speed of the engine. It shall be appreciated that the idle speed of the engine may be different in various embodiments including different types of engines. For example, some engines may have idle speeds of 300 rpm or potentially lower. Other engines may have idle speeds of 1200 rpm or potentially higher. Some engines may have idle speeds in the range of 500 rpm to 800 rpm. It shall be further appreciated that the engine idle speed may be dynamically varied during engine operation, for example, the engine idle speed may be increased during engine warm-up operation and reduced once the engine is warm. Furthermore, the high-speed starting speed is generally greater than a non-high speed or normal starting speed that is achievable by a dedicated starter motor of the engine.

Operation 112 may accelerate the engine of the vehicle toward a high-speed starting speed using a number of techniques. In some embodiments, operation 112 may accelerate the engine by reestablishing torque transmission between the engine and ground-contacting wheels of the vehicle during motion of the vehicle. Such techniques may be referred to as inertia methods or techniques. In some such embodiments, the act of reestablishing torque transmission may include closing or engaging in a clutch such as clutch 34 or another clutch operatively coupled with and positioned intermediate an engine and ground-contacting wheels of a vehicle. In some embodiments, operation 108 or a subsequent operation may shift a transmission from neutral into gear, such as transmission 26 or another transmission operatively coupled with and positioned intermediate an engine and ground-contacting wheels of the vehicle.

In some embodiments, operation 112 may accelerate the engine by operating a traction motor to apply torque to the engine, such as motor/generator 25 or another motor/generator operatively coupled with an engine of a vehicle. Such techniques may be referred to as traction motor methods or techniques.

In some embodiments, operation 112 may accelerate the engine by reestablishing torque transmission between the engine and ground-contacting wheels of the vehicle during motion of the vehicle in combination with operating a traction motor to apply torque to the engine. Such techniques may be referred to as traction motor plus inertia methods or techniques.

Operation 112 preferably accelerates the engine of the vehicle toward a high-speed starting speed while fueling of the engine is stopped and a cylinder decompression mechanism activated. Operation 112 may affirmatively maintain a fueling stopped condition or may take no action to change a previously established fueling stopped condition. Operation 112 may activate the cylinder decompression mechanism, or the cylinder decompression mechanism may be activated at preceding or subsequent operation.

From operation 112, method 100 proceeds to conditional 114. Conditional 114 evaluates whether high-speed starting conditions are met. If conditional 114 evaluates negative, method 100 proceeds to conditional 116. If conditional 114 evaluates affirmative, method 100 proceeds to operation 120. Conditional 114 may evaluate the high-speed starting conditions based on or in response to a number of conditions.

In some embodiments, conditional 114 may evaluate the high-speed starting conditions based on or in response to a speed of the engine reaching or exceeding a speed threshold corresponding to the high-speed starting speed. In some such embodiments, the speed threshold may be a fixed or predetermined value that may be set to or the high-speed starting speed or set relative to the high-speed starting speed such as a value offset from or within a threshold of the high-speed starting speed. In some such embodiments, the speed threshold may be dynamically determined. In some such embodiments, the speed threshold may be dynamically determined in response to a speed of a transmission input shaft speed such as transmission input shaft 24 or an input shaft of another transmission.

In some embodiments, conditional 114 may evaluate the high-speed starting conditions based on or in response to a state of vehicle clutch engagement. For example, in embodiments where the engine is accelerated toward a high-speed starting speed in whole or in part by closing a clutch, a predetermined amount or degree of clutch engagement may be utilized as a basis for deactivating cylinder decompression. The predetermined amount or degree of clutch engagement may be selected based on an assumed torque, power, or shaft speed transfer condition corresponding to a given amount or degree of clutch engagement. The amount or degree of clutch engagement may be translated explicitly translated to engine speed or implicitly taken as a proxy or correlate of engine speed and references herein to controls and control operations utilizing engine speed shall be understood to apply to and include an amount or degree of clutch engagement.

In some embodiments, conditional 114 may evaluate the high-speed starting conditions based on or in response to a state of an air handling system operatively coupled with the engine. In some such embodiments, the condition of the air handling system may include a turbocharger speed which may be utilized as a proxy or correlate of engine speed. In some such embodiments, the condition of the air handling system may include an intake charge flow which may be utilized as a proxy or correlate of engine speed. In some such embodiments, a plurality of the foregoing or other conditions of an air handling system may be utilized as a proxy or correlate of engine speed providing redundancy and error compensation. The state of the air handling system may be translated explicitly translated to engine speed or implicitly taken as a proxy or correlate of engine speed and references herein to controls and control operations utilizing engine speed shall be understood to apply to and include a state of the air handling system.

In some embodiments, conditional 114 may evaluate the high-speed starting conditions based on or in response to a condition of a fuel system operatively coupled with the engine. In some such embodiments, the condition of the fuel system may include fuel pressure which may be utilized as a proxy or correlate of engine speed. The state of the fuel system may be translated explicitly translated to engine speed or implicitly taken as a proxy or correlate of engine speed and references herein to controls and control operations utilizing engine speed shall be understood to apply to and include a state of the fuel system.

Operation 120 resumes operation of the engine by deactivating the cylinder decompression mechanism based on or in response to the high-speed starting conditions being evaluated affirmative and thereafter restarting fueling of the engine. Thus, the conditions described above in connection with the evaluation performed by conditional 114 may be utilized as a basis or response trigger for deactivating the cylinder decompression mechanism.

In some embodiments, the act of deactivating the cylinder decompression mechanism is performed in response to a speed of the engine reaching or exceeding a speed threshold corresponding to the high-speed starting speed. In some such embodiments, the speed threshold may be a fixed or predetermined value that may be set to or the high-speed starting speed or set relative to the high-speed starting speed such as a value offset from or within a threshold of the high-speed starting speed. In some such embodiments, the speed threshold may be dynamically determined. In some such embodiments, the speed threshold may be dynamically determined in response to a speed of a transmission input shaft speed such as transmission input shaft 24 or an input shaft of another transmission.

In some embodiments, the act of deactivating the cylinder decompression mechanism is performed in response to a state of vehicle clutch engagement. For example, in embodiments where the engine is accelerated toward a high-speed starting speed in whole or in part by closing a clutch, a predetermined amount or degree of clutch engagement may be utilized as a basis for deactivating cylinder decompression. The predetermined amount or degree of clutch engagement may be selected based on an assumed torque, power, or shaft speed transfer condition corresponding to a given amount or degree of clutch engagement.

In some embodiments, the act of deactivating the cylinder decompression mechanism is performed in response to a state of an air handling system operatively coupled with the engine. In some such embodiments, the condition of the air handling system may include a turbocharger speed which may be utilized as a proxy or correlate of engine speed. In some such embodiments, the condition of the air handling system may include an intake charge flow which may be utilized as a proxy or correlate of engine speed. In some such embodiments, a plurality of the foregoing or other conditions of an air handling system may be utilized as a proxy or correlate of engine speed providing redundancy and error compensation.

In some embodiments, the act of deactivating the cylinder decompression mechanism is performed in response to a condition of a fuel system operatively coupled with the engine. In some such embodiments, the condition of the fuel system may include fuel pressure which may be utilized as a proxy or correlate of engine speed.

Conditional 116 evaluates whether non-high-speed starting conditions are met. If conditional 116 evaluates negative, method 100 proceeds to conditional 114. If conditional 116 evaluates affirmative, method 100 proceeds to operation 120. Conditional 116 may evaluate the non-high-speed starting conditions based on or in response to a number of conditions. In some forms, conditional 116 may determine that the engine should be started regardless of whether the high-speed starting conditions are achieved, for example, in situations where the engine begins decelerating or experiences other indications that the high-speed starting conditions will not be or are not likely to be achieved. In some forms, conditional 116 may be omitted and its functionality may be subsumed by conditional 114. From operation 120, method 100 proceeds to operation 199 and ends or repeats.

Control method 100 may utilize one or more target speeds corresponding to the high-speed starting speed in accelerating the engine while fueling of the engine is stopped and a cylinder decompression mechanism activated. For example, as illustrated in graph 200 of FIG. 3, control method 100 (e.g., at operation 112 or another operation) may establish a target speed 240 corresponding to the high-speed starting speed that is greater than the engine idle speed 210. In some embodiments, target speed 240 may be a fixed value.

Figure 3:
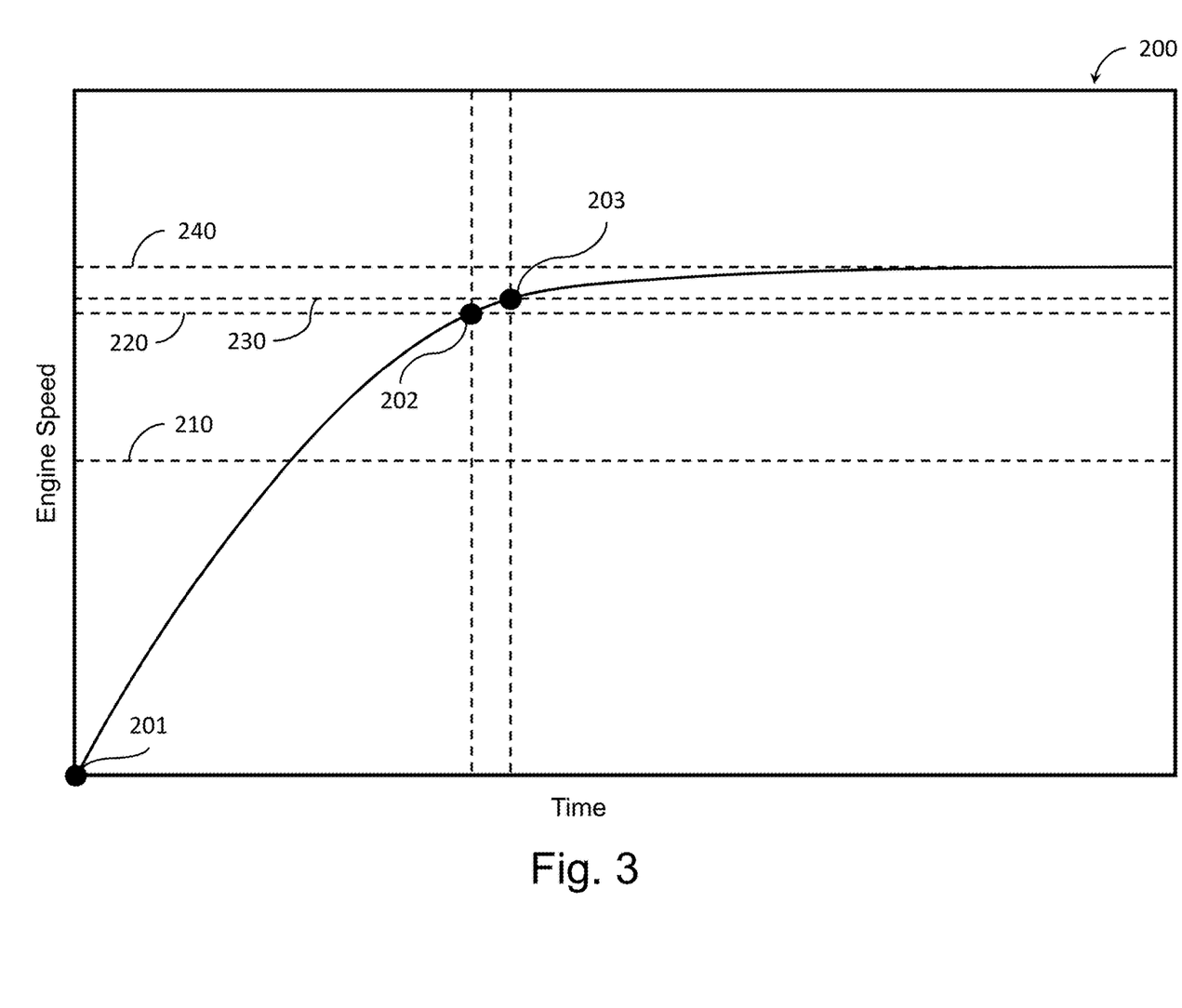
FIG. 3 is a graph illustrating certain aspects of an example engine high-speed starting event.

In some embodiments, target speed 240 may be variable. For example, in some such embodiments, target speed 240 may vary in response to variation in the speed of a transmission input shaft (e.g., transmission input shaft 24 of transmission 26 or another transmission input shaft or another transmission). The variation in target speed 240 may range from a maximum speed which may be established as the greatest speed desired for engine start to a minimum speed corresponding to idle speed 210 or another lower limit.

The high-speed starting conditions may consider whether a target speed 220 which is established relative to a target speed 240 has been achieved. In the illustrated example, target speed 220 is offset from target speed 240. The offset may be a predetermined or constant value, a percentage value, or a variable value. In other embodiments, target speed 220 may be set equal to target speed 240.

Target speed 220 may be utilized as a basis for disabling a cylinder decompression mechanism. For example, the engine acceleration of operation 112 may commence at point 201 at which point fueling of the engine is stopped and the cylinder decompression mechanism is enabled. Engine speed may thereafter increase past idle speed 210 up to target speed 220 at which point the cylinder decompression mechanism is disabled.

Target speed 230 may be utilized as a basis for resuming fueling of the engine. For example, the engine acceleration of operation 112 may continue to increase from point 202 and target speed 220 to point 203 and target speed 230 at which point the fueling of the engine resumes. In some embodiments, target speed 230 may be omitted and point 203 may be deemed to have been reached at a defined time after point 202.

As illustrated by the foregoing description, the present disclosure contemplates multiple embodiments including the following examples.

A first example embodiment is a method of operating a vehicle including an engine, the method comprising: operating an electronic control system to perform acts of suspending operation of the engine during operation of the vehicle including stopping fueling of the engine, accelerating the engine to a high-speed starting speed with fueling of the engine stopped and a cylinder decompression mechanism activated, the high-speed starting speed being greater than an idle speed of the engine, and resuming operation of the engine including deactivating the cylinder decompression mechanism at the high-speed starting speed and thereafter restarting fueling of the engine.

A second example embodiment includes the features of the first example embodiment, wherein the act of suspending operation of the engine includes interrupting torque transmission between the engine and ground-contacting wheels of the vehicle.

A third example embodiment includes the features of the second example embodiment, wherein the act of accelerating the engine includes reestablishing torque transmission between the engine and ground-contacting wheels of the vehicle during motion of the vehicle.

A fourth example embodiment includes the features of any one of the first through third example embodiments, wherein the act of accelerating the engine includes operating a traction motor to apply torque to the engine.

A fifth example embodiment includes the features of any one of the first through third example embodiments, wherein the act of deactivating the cylinder decompression mechanism is performed in response to a speed of the engine reaching or exceeding a speed threshold corresponding to the high-speed starting speed.

A sixth example embodiment includes the features of the fifth example embodiment, and comprises dynamically determining the speed threshold in response to a transmission input shaft speed.

A seventh example embodiment includes the features of any one of the first through third example embodiments, wherein the act of deactivating the cylinder decompression mechanism is performed in response to a state of vehicle clutch engagement.

An eighth example embodiment includes the features of any one of the first through third example embodiments, wherein the act of deactivating the cylinder decompression mechanism is performed in response to sensing a condition of an air handling system operatively coupled with the engine.

A ninth example embodiment includes the features of any one of the first through third example embodiments, wherein the act of deactivating the cylinder decompression mechanism is performed in response to sensing a condition of a fuel system operatively coupled with the engine.

A tenth example embodiment includes the features of any one of the first through third example embodiments, wherein the high-speed starting speed is greater than a normal starting speed achievable by a dedicated starter motor of the engine.

An eleventh example embodiment is a system comprising: a vehicle including an engine and an electronic control system, the electronic control system being configured to suspend operation of the engine during operation of the vehicle including stopping fueling of the engine, accelerate the engine to a high-speed starting speed with fueling of the engine stopped and a cylinder decompression mechanism activated, the high-speed starting speed being greater than an idle speed of the engine, and resume operation of the engine including deactivating the cylinder decompression mechanism at the high-speed starting speed and thereafter restarting fueling of the engine.

A twelfth example embodiment includes the features of the eleventh example embodiment, wherein the electronic control system being configured to suspend operation of the engine includes the electronic control system being configured to interrupt torque transmission between the engine and ground-contacting wheels of the vehicle.

A thirteenth example embodiment includes the features of the twelfth example embodiment, wherein the electronic control system being configured to accelerate the engine includes the electronic control system being configured to reestablish torque transmission between the engine and ground-contacting wheels of the vehicle during motion of the vehicle.

A fourteenth example embodiment includes the features of any one of the eleventh through thirteenth example embodiments, wherein the electronic control system being configured to accelerate the engine includes the electronic control system being configured to operate a traction motor to apply torque to the engine.

A fifteenth example embodiment includes the features of any one of the eleventh through thirteenth example embodiments, wherein the electronic control system is configured to deactivate the cylinder decompression mechanism in response to a speed of the engine reaching or exceeding a speed threshold corresponding to the high-speed starting speed.

A sixteenth example embodiment includes the features of the fifteenth example embodiment, wherein the electronic control system is configured to dynamically determine the speed threshold in response to a transmission input shaft speed.

A seventeenth example embodiment includes the features of any one of the eleventh through thirteenth example embodiments, wherein the electronic control system is configured to deactivate the cylinder decompression mechanism in response to a state of vehicle clutch engagement.

A eighteenth example embodiment includes the features of any one of the eleventh through thirteenth example embodiments, wherein the electronic control system is configured to deactivate the cylinder decompression mechanism in response to sensing a condition of an air handling system operatively coupled with the engine.

A nineteenth example embodiment includes the features of any one of the eleventh through thirteenth example embodiments, wherein the electronic control system is configured to deactivate the cylinder decompression mechanism in response to sensing a condition of a fuel system operatively coupled with the engine.

A twentieth example embodiment includes the features of any one of the eleventh through thirteenth example embodiments, wherein the high-speed starting speed is greater than a normal starting speed achievable by a dedicated starter motor of the engine.

A twenty-first example embodiment is an apparatus comprising: a non-transitory memory medium configured to store instructions executable by a processor to perform acts of: suspending operation of an engine during operation of a vehicle including stopping fueling of the engine, accelerating the engine to a high-speed starting speed with fueling of the engine stopped and a cylinder decompression mechanism activated, the high-speed starting speed being greater than an idle speed of the engine, and resuming operation of the engine including deactivating the cylinder decompression mechanism at the high-speed starting speed and thereafter restarting fueling of the engine.

A twenty-second example embodiment includes the features of the twenty-first example embodiment, wherein the instructions to perform the act of suspending operation of the engine includes the instructions being executable by the processor to perform the act of interrupting torque transmission between the engine and ground-contacting wheels of the vehicle.

A twenty-third example embodiment includes the features of the twenty-second example embodiment, wherein the instructions to perform the act of accelerating the engine includes the instructions being executable by the processor to perform the act of reestablishing torque transmission between the engine and ground-contacting wheels of the vehicle during motion of the vehicle.

A twenty-fourth example embodiment includes the features of any one of the twenty-first through twenty-third example embodiments, the instructions to perform the act of accelerating the engine includes the instructions being executable by the processor to perform the act of operating a traction motor to apply torque to the engine.

A twenty-fifth example embodiment includes the features of any one of the twenty-first through twenty-third example embodiments, the instructions to perform the act of deactivating the cylinder decompression mechanism are responsive to a speed of the engine reaching or exceeding a speed threshold corresponding to the high-speed starting speed.

A twenty-sixth example embodiment includes the features of any one of the twenty-first through twenty-third example embodiments, the instructions to perform the act of dynamically determining the speed threshold are responsive to a transmission input shaft speed.

A twenty-seventh example embodiment includes the features of any one of the twenty-first through twenty-third example embodiments, the instructions to perform the act of deactivating the cylinder decompression mechanism are responsive to a state of vehicle clutch engagement.

A twenty-eighth example embodiment includes the features of any one of the twenty-first through twenty-third example embodiments, the instructions to perform the act of deactivating the cylinder decompression mechanism are responsive to sensing a condition of an air handling system operatively coupled with the engine.

A twenty-ninth example embodiment includes the features of any one of the twenty-first through twenty-third example embodiments, the high-speed starting speed is greater than a normal starting speed achievable by a dedicated starter motor of the engine.

A thirtieth example embodiment includes the features of any one of the twenty-first through twenty-third example embodiments, the instructions to perform the act of deactivating the cylinder decompression mechanism are responsive to sensing a condition of a fuel system operatively coupled with the engine.

It shall be appreciated that terms such as "operative coupling," "operatively coupled," "operatively coupling," and the like refer to such coupling as may be indicated by one or more of the coupled elements, their configuration, their operation or operability, or other relevant context in which such terms are used, and may include conductive coupling, electrical coupling, galvanicly isolated coupling, magnetic coupling, optical coupling, wireless coupling, or other forms of coupling as will occur to one of skill in the art with the benefit and insight of the present disclosure as well as any of the aforementioned context as may be relevant.

It shall be appreciated that terms such as "a non-transitory memory," "a non-transitory memory medium," and "a non-transitory memory device" refer to a number of types of devices and storage mediums which may be configured to store information, such as data or instructions, readable or executable by a processor or other components of a computer system and that such terms include and encompass a single or unitary device or medium storing such information, multiple devices or media across or among which respective portions of such information are stored, and multiple devices or media across or among which multiple copies of such information are stored.

It shall be appreciated that terms such as "determine," "determined," "determining" and the like when utilized in connection with a control method or process, an electronic control system or controller, electronic controls, or components or operations of the foregoing refer inclusively to a number of acts, configurations, devices, operations, and techniques including, without limitation, calculation or computation of a parameter or value, obtaining a parameter or value from a lookup table or using a lookup operation, receiving parameters or values from a datalink or network communication, receiving an electronic signal (e.g., a voltage, frequency, current, or pulse-width modulation (PWM) signal) indicative of the parameter or value, receiving output of a sensor indicative of the parameter or value, receiving other outputs or inputs indicative of the parameter or value, reading the parameter or value from a memory location on a computer-readable medium, receiving the parameter or value as a run-time parameter, and/or by receiving a parameter or value by which the interpreted parameter can be calculated, and/or by referencing a default value that is interpreted to be the parameter value.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred, or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method of operating a vehicle including an engine, the method comprising:
    operating an electronic control system to perform acts of:
    suspending operation of the engine during operation of the vehicle including stopping fueling of the engine,
    accelerating the engine to a high-speed starting speed with fueling of the engine stopped and a cylinder decompression mechanism activated, the high-speed starting speed being greater than an idle speed of the engine, and
    resuming operation of the engine including deactivating the cylinder decompression mechanism at the high-speed starting speed and thereafter restarting fueling of the engine.

2. The method of claim 1, wherein the act of suspending operation of the engine includes interrupting torque transmission between the engine and ground-contacting wheels of the vehicle.

3. The method of claim 2, wherein the act of accelerating the engine includes reestablishing torque transmission between the engine and ground-contacting wheels of the vehicle during motion of the vehicle.

4. The method of any one of claim 1, wherein the act of accelerating the engine includes operating a traction motor to apply torque to the engine.

5. The method of any one of claim 1, wherein the act of deactivating the cylinder decompression mechanism is performed in response to a speed of the engine reaching or exceeding a speed threshold corresponding to the high-speed starting speed.

6. The method of claim 5, comprising dynamically determining the speed threshold in response to a transmission input shaft speed.

7. The method of any one of claim 1, wherein the act of deactivating the cylinder decompression mechanism is performed in response to a state of vehicle clutch engagement.

8. The method of any one of claim 1, wherein the act of deactivating the cylinder decompression mechanism is performed in response to sensing a condition of an air handling system operatively coupled with the engine.

9. The method of any one of claim 1, wherein the act of deactivating the cylinder decompression mechanism is performed in response to sensing a condition of a fuel system operatively coupled with the engine.

10. The method of any one of claim 1, wherein the high-speed starting speed is greater than a normal starting speed achievable by a dedicated starter motor of the engine.

11. A system comprising:
    a vehicle including an engine and an electronic control system, the electronic control system being configured to:
    suspend operation of the engine during operation of the vehicle including stopping fueling of the engine,
    accelerate the engine to a high-speed starting speed with fueling of the engine stopped and a cylinder decompression mechanism activated, the high-speed starting speed being greater than an idle speed of the engine, and
    resume operation of the engine including deactivating the cylinder decompression mechanism at the high-speed starting speed and thereafter restarting fueling of the engine.

12. The system of claim 11, wherein the electronic control system being configured to suspend operation of the engine includes the electronic control system being configured to interrupt torque transmission between the engine and ground-contacting wheels of the vehicle.

13. The system of claim 12, wherein the electronic control system being configured to accelerate the engine includes the electronic control system being configured to reestablish torque transmission between the engine and ground-contacting wheels of the vehicle during motion of the vehicle.

14. The system of any one of claim 11, wherein the electronic control system being configured to accelerate the engine includes the electronic control system being configured to operate a traction motor to apply torque to the engine.

15. The system of any one of claim 11, wherein the electronic control system is configured to deactivate the cylinder decompression mechanism in response to a speed of the engine reaching or exceeding a speed threshold corresponding to the high-speed starting speed.

16. The system of claim 15, wherein the electronic control system is configured to dynamically determine the speed threshold in response to a transmission input shaft speed.

17. The system of any one of claim 11, wherein the electronic control system is configured to deactivate the cylinder decompression mechanism in response to a state of vehicle clutch engagement.

18. The system of any one of claim 11, wherein the electronic control system is configured to deactivate the cylinder decompression mechanism in response to sensing a condition of an air handling system operatively coupled with the engine.

19. The system of any one of claim 11, wherein the electronic control system is configured to deactivate the cylinder decompression mechanism in response to sensing a condition of a fuel system operatively coupled with the engine.

20. The system of any one of claim 11, wherein the high-speed starting speed is greater than a normal starting speed achievable by a dedicated starter motor of the engine.

21. An apparatus comprising:
a non-transitory memory medium configured to store instructions executable by a processor to perform acts of:
suspending operation of an engine during operation of a vehicle including stopping fueling of the engine,
accelerating the engine to a high-speed starting speed with fueling of the engine stopped and a cylinder decompression mechanism activated, the high-speed starting speed being greater than an idle speed of the engine, and
resuming operation of the engine including deactivating the cylinder decompression mechanism at the high-speed starting speed and thereafter restarting fueling of the engine.

22. The apparatus of claim 21, wherein the instructions to perform the act of suspending operation of the engine includes the instructions being executable by the processor to perform the act of interrupting torque transmission between the engine and ground-contacting wheels of the vehicle.

23. The apparatus of claim 22, wherein the instructions to perform the act of accelerating the engine includes the instructions being executable by the processor to perform the act of reestablishing torque transmission between the engine and ground-contacting wheels of the vehicle during motion of the vehicle.

24. The apparatus of any one of claim 21, wherein any one or more of:
(a) the instructions to perform the act of accelerating the engine includes the instructions being executable by the processor to perform the act of operating a traction motor to apply torque to the engine;
(b) the instructions to perform the act of deactivating the cylinder decompression mechanism are responsive to a speed of the engine reaching or exceeding a speed threshold corresponding to the high-speed starting speed;
(c) the instructions to perform the act of dynamically determining the speed threshold are responsive to a transmission input shaft speed;
(d) the instructions to perform the act of deactivating the cylinder decompression mechanism are responsive to a state of vehicle clutch engagement;
(e) the instructions to perform the act of deactivating the cylinder decompression mechanism are responsive to sensing a condition of an air handling system operatively coupled with the engine;
(f) the instructions to perform the act of deactivating the cylinder decompression mechanism are responsive to sensing a condition of a fuel system operatively coupled with the engine; and
(g) the high-speed starting speed is greater than a normal starting speed achievable by a dedicated starter motor of the engine.

* * * * *